(No Model.)
J. J. O'LALOR.
ELECTRIC BATTERY.
No. 486,264. Patented Nov. 15, 1892.
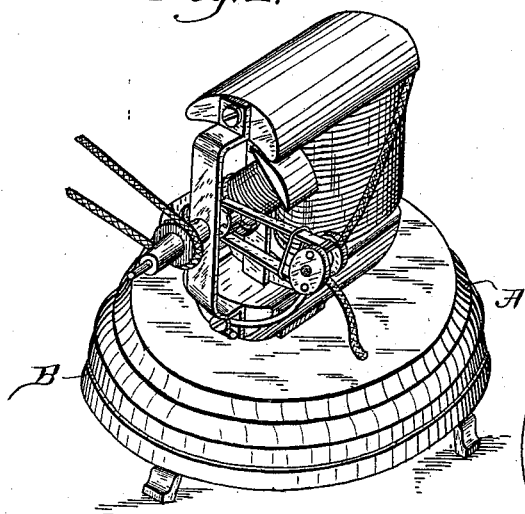
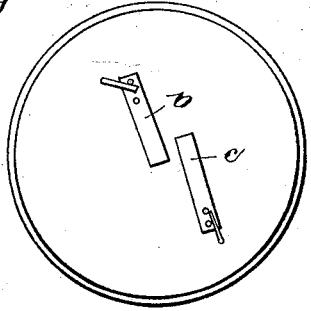
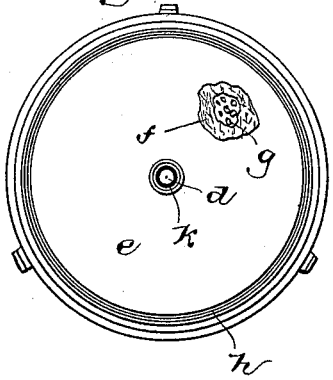
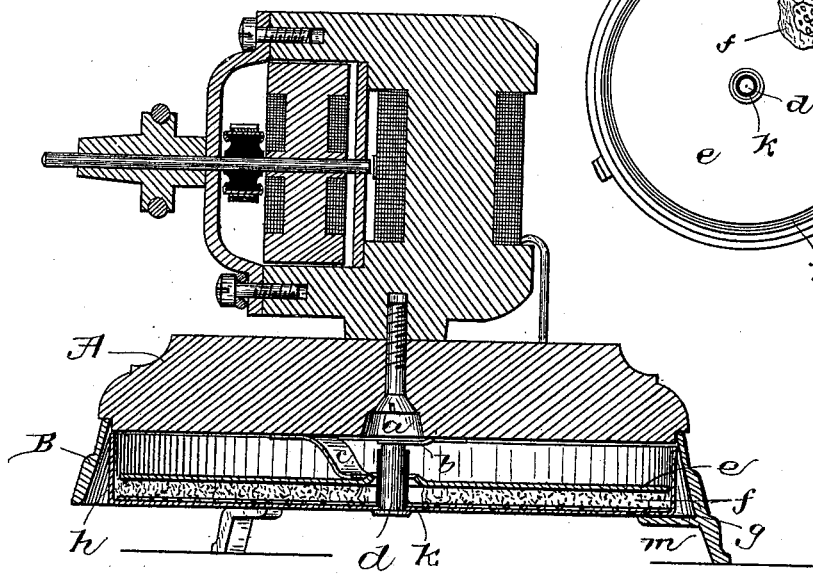
Witnesses:
Howard F. Eaton.
Charles L. Long.
Inventor:
John J. O'Lalor
by Frederick C. Dowd
his atty

UNITED STATES PATENT OFFICE.

JOHN J. O'LALOR, OF BOSTON, ASSIGNOR OF ONE-HALF TO JOHN S. MAXWELL, OF MEDFORD, MASSACHUSETTS.

ELECTRIC BATTERY.

SPECIFICATION forming part of Letters Patent No. 486,264, dated November 15, 1892.

Application filed October 3, 1891. Serial No. 407,653. (No model.)

*To all whom it may concern:*

Be it known that I, JOHN J. O'LALOR, a citizen of the United States, residing at Boston, in the county of Suffolk and State of Massachusetts, have invented a new and useful Improvement in Electric Batteries, of which the following is a full, clear, and exact description, reference being had to the accompanying drawings, forming part of this specification.

The object of this invention is the construction of an improved electric battery of the kind having a removable cover capable when replaced of automatically closing the circuit between the battery and a motor or other electro device mounted on said cover. I accomplish this in the manner hereinafter set forth.

In the accompanying drawings, forming a part of this specification, Figure 1 is a perspective view of the invention complete. Fig. 2 is an under view of the battery-cover. Fig. 3 is a plan view of the battery. Fig. 4 is a vertical section of the battery and motor.

My battery consists, essentially, of the frame B, cover A, copper receptacle H, and zinc disk E.

The frame B, preferably of cast-iron, is formed with an inwardly-extending rim M, upon which rests the copper receptacle or cell H. At the center of this cell H, which I usually make circular in form, is the vertical contact-post D, and embracing this post is a rubber insulating-sleeve K.

In charging the battery a layer G of pulverized sulphate of copper is placed in the cell H. Upon this a circular centrally-apertured felt pad is laid, and upon the latter the centrally-apertured zinc disk E. Before being used the felt pad is of course moistened with water.

The battery-cover A, upon which is mounted an electromotor or other electric device, has affixed to its under side the elastic contact-fingers B and C, these being each rigidly held at one end and adapted to normally press downward. The free end of one of these fingers is at the peripheral center of the cover A, while the other is intermediate between the center and the rim of the cell H. Hence when the cover A is placed upon the cell H one contact-finger rests upon the contact-post D and the other upon the zinc disk E. The motor or other device having its terminal wires joined to said fingers B C, the battery-circuit is closed and electrical action begins.

As will be readily seen, the contact-post D being at the peripheral center of the battery-cell and the terminal or contact-finger B being at the peripheral center of the cover A, no matter how the cover is placed upon the battery contact is at once made between said post and terminal. Furthermore, since the terminal or contact-finger C can complete the circuit by contact at any point upon the disk E no care need be taken in replacing the cover.

Another important advantage derived from the circular form of my cover and battery and the central position of the contact-post D is this: If by any means the contact-surfaces of the terminal C and zinc disk E become coated with dirt or other non-conductive matter, the cover can be turned until by the trailing of said terminal upon the disk such surfaces are sufficiently cleaned to insure a closed circuit.

Although I have described my battery as circular in form, it may be a polygon of less than an infinite number of sides, even down to a regular polygon of six, four, or even three sides. In each case the post D is at the peripheral center of the battery and cover.

What I claim as my invention is—

In an electric battery, the circular copper cell having central post *d*, the insulating-sleeve K about said post, the circular centrally-apertured pad in said cell, and the circular centrally-apertured zinc disk E, resting upon said pad, said post rising through said apertures, in combination with the circular removable cover A, having a central terminal and a terminal adapted to contact with said zinc disk, whereby not only is the circuit closed upon the placing in any position of the cover upon the cell, but the contact can be insured by a partial rotation of said cover, substantially as set forth.

JOHN J. O'LALOR.

Witnesses:
   C. C. MELLEN,
   PETER DALY.